Figure 1:
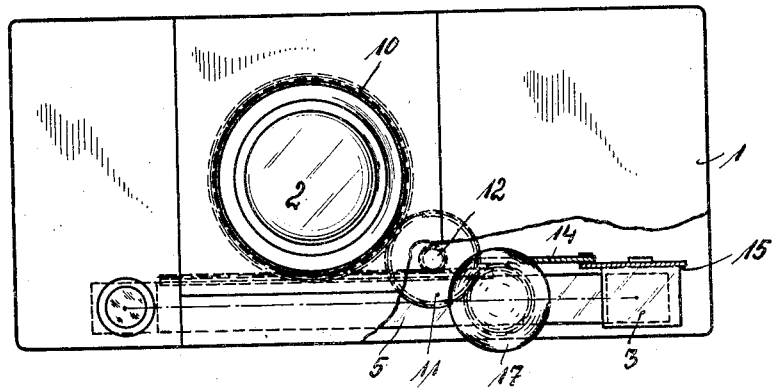

April 14, 1936.   H. KÜPPENBENDER   2,037,513
PHOTOGRAPHIC CAMERA
Filed June 29, 1934

Inventor:
H. Küppenbender
by:
Hans Heverich
Attorney

Patented Apr. 14, 1936

2,037,513

UNITED STATES PATENT OFFICE 2,037,513

PHOTOGRAPHIC CAMERA

Heinz Küppenbender, Dresden, Germany, assignor to Zeiss Ikon Aktiengesellschaft Dresden, Dresden, Germany Application June 29, 1934, Serial No. 732,983
In Germany September 21, 1933

11 Claims. (Cl. 95—44)

With photographic cameras in which the sharp adjustment of the objective with respect to the object to be photographed is effected by looking at the latter through a distance meter coupled with the means for moving the objective, it is necessary to employ a distance meter which is so designed that if the camera should, perhaps be slightly damaged or in the case of fluctuations of the temperature possibly no faults in measuring the distance or in adjusting the objective for sharp photographing are thereby caused.

With the mirror basis distance meters hitherto used for the purpose stated, in which meters the pencil of rays, or the measuring ray respectively, is deflected by the turning of a mirror, this turning must be extremely accurate, as the deflection is, as is known, equal to double the angle of turning of the mirror. The means supporting the axle carrying the mirror, as well as the means for transmitting the motion from said axle to the objective adjusting means, must, therefore, be of excellent workmanship and they are extraordinarily sensitive as regards even minute variations of their proper position, as otherwise the sharp adjustment and the measurement will no more be exact.

Now, in order to obviate entirely the use of turnable mirrors, I have modified the construction in such a manner that the measuring ray is deflected by changing the position of an optical wedge. This wedge may be formed by cylindrical lenses or by spherical ones. In front of the reflecting surface of the distance meter, upon which surface the pencil of rays first impinges I place a system of lenses of such a kind that an optical zero effect can be attained. That system of lenses can be composed, for instance, of a positive and a negative cylindrical lens, which two lenses have equal radii of curvature. It is possible to place these lenses in such a manner relatively to one another that they constitute a plano-parallel plate and are, therefore, optically ineffective. If one of said lenses is turned about its cylinder axis, the two lenses together form an optical wedge by which the pencil of rays, or the measuring ray respectively, is deflected. By choosing suitably the radii of curvature of the two lenses, it is rendered possible to produce quite insignificant angle deflections by a large shifting of the lenses with respect to one another. This is very advantageous insofar as a thus designed distance meter mechanism can be built with a comparatively large allowance wherefrom results a considerable reduction of the manufacturing costs in proportion to the manufacturing costs of the known constructional forms of distance meters of the type in question.

Instead of the above-mentioned cylindrical lenses also plano-convex spherical lenses may be used. The chief point is that the lenses permit to obtain an optical zero effect. When spherical lenses are used, the possibility is present that one of the two lenses can be made adjustable on a spherical surface, the centre of which is formed by the common radius of curvature of the two lenses so that faults in height and lateral faults of the distance meter can be compensated.

Figure 2:
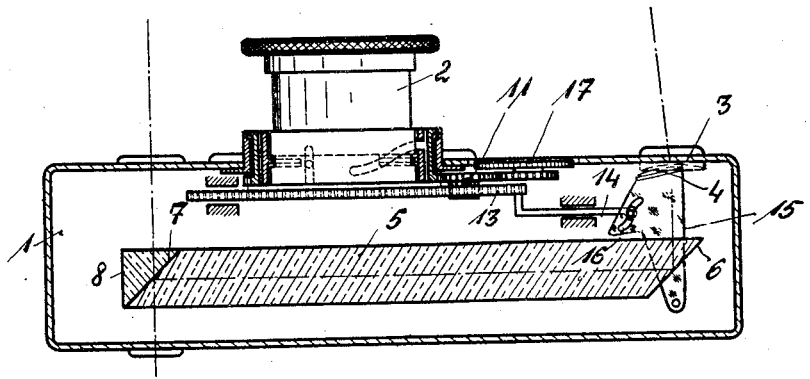

The invention is illustrated diagrammatically and by way of example on the accompanying drawing on which Figure 1 is a front-view of a photographic camera designed according to this invention, and Figure 2 is partly a plan of, and partly a horizontal section through, the same.

1 is a roll film camera equipped with an exchangeable exposing objective which can be axially shifted by means of a worm-thread for sharp adjustment. The movement of the objective is transmitted to a distance meter formed of lenses 3 and 4 and a rhombic glass prism 5 which constitutes the basis of the distance meter. 6 and 7 denote the reflexion surfaces. To the semi-transparent silvered or gilt surface 7 is cemented a prism 8 permitting direct observation of the object to be photographed. The lens 3 is, in the example shown, stationary, whereas the lens 4 is turnable relatively to the lens 3. I wish it, however, to be understood that also the lens 3 may be turnable, or both lenses may be adjustable with respect to one another. The lens 4 is attached to an arm 15 that is turnable on a pivot 9. Transmitting the motion from the objective to the movable lens 4 is effected by means of cog-wheels 10, 11 and 12; this last wheel meshes with a rack 13 connected by a rod 14 with the arm 15 that bears the lens 4. This arm has a curved slot 16 resembling an elongated S, and the adjacent end of the rod 14 forms a finger that engages said slot, as shown in Fig. 2. The slot 16 is a correction slot, the shape of which is such that measuring faults due to the transmission members are rendered ineffective. Adjusting the exposing objective 2 is effected by means of the adjusting wheel 17.

I claim:

1. In a photographic camera, in combination with an objective, means for adjusting the same, a distance meter, means for coupling the latter with said adjusting means, and a positive and a negative optical lens with similar radii of curvature adapted to produce a zero optical effect said lenses forming an optical wedge adapted to deflect the measuring ray.

2. In a photographic camera, in combination with an objective, means for adjusting the same, a distance meter, means for coupling the same with said adjusting means, a positive and a negative optical lens with similar radii of curvature adapted to produce a zero optical effect said lenses forming an optical wedge of variable strength adapted to deflect the measuring ray.

3. In a photographic camera, in combination with an objective, means for adjusting the same, a distance meter, means for coupling this latter with said adjusting means, a positive lens and a negative lens with similar radii of curvature adapted to be moved about an axis standing vertical to the measuring plane and adapted to form an optical wedge adapted to deflect the measuring ray.

4. In a photographic camera, in combination with an objective, means for adjusting the same, a distance meter, means for coupling said distance meter with said adjusting means, two cylindrical lenses possessing similar radii of curvature forming an optical wedge adapted to deflect the measuring ray.

5. In a photographic camera, in combination with an objective, means for adjusting the same, a distance meter, means for coupling it with said adjusting means, two cylindrical lenses possessing similar radii of curvature so that their optical effect is zero and arranged so that their axis is vertical to the measuring plane of said distance meter forming an optical wedge adapted to deflect the measuring rays.

6. In a photographic camera, in combination, an objective, means for adjusting the same, a distance meter, means coupling this latter with said adjusting means, two spherical lenses possessing similar radii or curvature so that their optical effect is zero forming and an optical wedge adapted to deflect the measuring ray.

7. In a photographic camera, in combination, an objective, means for adjusting the same, a distance meter, means for coupling it with said adjusting means, a stationary lens and a movable lens normally located the one relative to the other so that the optical effect is zero, said two lenses forming an optical wedge adapted to deflect the measuring ray, and means for moving said movable lens around the common centre of curvature of the two lenses when the rays of light are deflected.

8. In a photographic camera, in combination, an objective, means for adjusting the same, a distance meter, means coupling the distance meter with said adjusting means, a stationary lens and a movable lens, said lenses having a common centre of curvature and forming an optical wedge adapted to deflect the measuring ray, means for moving said movable lens around the common centre axis of the lenses when the rays of light are deflected.

9. In a photographic camera, in combination, an objective, means for adjusting it, a distance meter, means coupling it with said adjusting means, two optical lenses normally so arranged relatively to one another that the optical effect is zero said lenses having a common centre of curvature and forming an optical wedge adapted to deflect the measuring ray, means for moving said lenses around their common centre of curvature when the distance is being measured, and a rhombic prism constituting the basis of said distance meter, said prism and said lenses being in optical relation with respect to one another.

10. In a photographic camera, in combination, an objective, a distance meter, means for adjusting said objective and means for coupling said meter and said adjusting means with one another, a stationary spherical lens and a movable spherical lens normally so arranged with respect to one another that the optical effect is zero, said lenses forming an optical wedge adapted to deflect the measuring ray, the movement of said movable lens adapted to be used for adjusting the faults of the distance meter in height and laterally.

11. In a photographic camera, in combination, an objective, means for adjusting said objective, a distance meter, means coupling said distance meter with said adjusting means, and two mutually turnable lenses having a common centre of curvature and forming a curved correction member arranged in front of said distance meter adapted to correct the faults arising when said distance meter and said adjusting means of said objective are coupled with one another, substantially as set forth.

HEINZ KÜPPENBENDER.